United States Patent [19]

Levy et al.

[11] 4,104,769
[45] Aug. 8, 1978

[54] APPARATUS FOR STRETCHING FILM

[75] Inventors: Stanley Burton Levy; William Drake Garlington, both of Wilmington, Del.

[73] Assignee: E. I. Du Pont de Nemours and Company, Wilmington, Del.

[21] Appl. No.: 666,263

[22] Filed: Mar. 12, 1976

[51] Int. Cl.² ............................................. D06C 3/04
[52] U.S. Cl. ........................................ 26/92; 34/158; 425/66
[58] Field of Search ............................. 26/72, 73, 92; 219/388 C, 388 W; 264/289; 34/48, 158; 425/66

[56] References Cited

U.S. PATENT DOCUMENTS

| 2,328,827 | 9/1943 | Martin | 26/92 |
|---|---|---|---|
| 2,473,404 | 6/1949 | Young | 26/92 |
| 3,184,787 | 5/1965 | Steegmans | 26/72 X |
| 3,235,931 | 2/1966 | Bruckner | 26/92 |
| 3,404,205 | 10/1968 | Ballard et al. | 264/289 |
| 3,646,188 | 2/1972 | Campbell | 264/289 X |
| 3,782,873 | 1/1974 | Knowles | 26/72 X |
| 3,793,741 | 2/1974 | Smith, Jr. | 34/48 |

Primary Examiner—Robert R. Mackey

[57] ABSTRACT

An apparatus for stretching polymeric film is disclosed wherein a heating unit is located slightly above and between the parallel tracks of a tenter frame and wherein the heating unit includes an air duct with an air entrance opening and a series of apertures directed between the tenter frame tracks wherein the air duct is separated, by internal intermediate walls, into adjacent isolated zones extending parallel with the tracks of the tenter frame and wherein each isolated zone includes a heater. Air introduced into the duct is conducted through the zones where it is heated and directed through the apertures onto a web of polymeric film moving in the tenter frame prior to stretching.

6 Claims, 4 Drawing Figures

APPARATUS FOR STRETCHING FILM

BACKGROUND OF THE INVENTION

1. Field of the Invention

This invention is a method of and apparatus for stretching polymeric film in which a web of film is heated in a tenter frame by an air duct/multiple heater combination positioned closely adjacent the web whereby improved preferential heating in a selected lane is brought about to obtain improved film properties.

2. Description of the Prior Art

Methods of selectively, and preferentially, heating polymeric film prior to stretching are known to the art.

U.S. Pat. No. 3,161,711 to Tassler is exemplary of the known art wherein a series of radiant heaters is suitably mounted over the film immediately ahead of the stretching device, such as a tenter frame. Such heaters are disposed, preferably, for the full width of the film web and are spaced apart, parallel to each other in the direction of web travel. The heaters may be individually controlled preferentially to heat the web while it is substantially free from tension along at least one selected longitudinal lane.

U.S. Pat. No. 3,649,726 to Knowles shows a method of controlling the thickness of the polymer film structures in which heaters of the type shown in U.S. Pat. No. 3,161,711 are used preferentially to heat a web of material prior to stretching. Briefly, such method includes measuring the thickness of the film at a location across the width before stretching; measuring the thickness of the film at any location across the width thereof after stretching; computing the cumulative mass values of the film structure across the width thereof before and after stretching; and adjusting the thickness of the film at any point across the width thereof before stretching responsive to deviation from a preselected value in the thickness of the film after stretching corresponding to the cumulative mass value of the film before and after stretching. Again, as with the Tassler patent preferential heating method, the effectiveness of the heating depends upon the effectiveness of the heater used.

Other patents showing other than radiant means for heating a web of film prior to stretching include U.S. Pat. No. 2,339,451 to Bailey et al which shows heating during transverse direction stretching by a plurality of gas burners. The burners are positioned in a zigzag configuration to prevent overheating of individual lanes.

Further, U.S. Pat. No. 2,412,187 to Wiley et al shows the controlling of heat input from internally steam heated radiators to separate portions of the web during machine direction, and prior to cross-machine direction stretching and U.S. Pat. No. 3,304,205 to Ballard et al shows heating alternate edges of the web in a tenter preheat zone to control the transverse direction stretching pattern. The heating means disclosed are radiant or air.

A problem with the teachings of this art, and the other known art, is that it does not show a way to effectively control within very narrow limits the heating of a web in a tenter frame prior to stretching primarily because of the distance of the web from the radiant heater or by failure effectively to isolate the heated air that impinges on the web.

There have been numerous other attempts to improve thickness properties in extruded films; apparatus and methods, for example, have evolved to sense thickness deviations and effect adjustment of film thickness at specific locations usually at or near the point of extrusion of the polymeric material in the film forming operation.

For instance, U.S. Pat. No. 3,122,782 describes a mechanical arrangement for adjusting the thickness of selected hypothetical lanes across a film structure corresponding to thicker or thinner portions of the film. In such patent, two interconnected multiple-junction terminal boards are disposed intermediate a film thickness sensing guage and an adjustment means for changing the width of the extrusion orifice from whence the film structure issues. The film thickness gauge measures the thickness of the film structure and transmits a bias signal through suitable relay elements for energizing motors which are so constructed and arranged to cause opening or closing of the orifice opening in the extruder in accordance with the deviation in the thickness of the film that is sensed by the film thickness measuring gauge.

In U.S. Pat. No. 3,455,175, an extrusion apparatus is disclosed with adjustable lip members containing a plurality of adjustment screws along the orifice slot. The screws are arranged closely together on about 20 mm (0.787 inch) spacing and are threaded into the lip members which have been modified near the extremities by locally weakened cross sections. Manual rotation of the small diameter screws results in displacement of the lip members and by that means the slot opening defining the thickness of the web is varied. Confining the deflection of a lip member to a narrow area approximating the width of a single adjustment screw is most difficult due to the inherent interaction of adjacent screws. Each time the setting of a screw is changed, there is a corresponding unavoidable disturbance of the setting of neighboring screws resulting in an unpredictable deflection of the lip members. To counteract the undesirable deflection, the settings of the neighboring screws must also be corrected. As a consequence, narrow band or streak non-uniformities cannot easily be eliminated without upsetting the basic gauge setting of the lips. As is apparent, adjustment means of this sort require constant personal attention and trial and error manipulation by skilled operating personnel.

Conversely, the difficulties of reliance on skilled operators and trail and error control are to some extent obviated by an automatic gauge control system, such as is disclosed in U.S. Pat. No. 3,122,784, which features a plurality of speed controlled adjustor motors mechanically coupled to displaceable lip segments on a web extrusion apparatus. The motors respond to signals generated by a traversing thickness sensing means located at some distance below the extrusion apparatus which measures the final thickness of the web from standard reference deviations. Electrical signals are thus generated, translated into thickness corrections and distributed by way of switching means sequentially to the input of the motors. This system cannot, however, eliminate narrow streak and gauge band non-uniformities because the individual adjustment means control relatively wide segments of the orifice slot. Moreover, the nature of the nonuniformities is often too subtle and complex for corrective adjustment by mechanical displacement of die lip members.

Another method of improving the thickness uniformity of film is shown in U.S. Pat. No. 3,819,775 wherein means are provided for selectively controlling (by heating or cooling) the temperature of isolated parts of die lips of an extrusion die whereby to improve thickness uniformity. There is no web heating immediately prior to stretching.

And, lastly, U.S. Pat. No. 3,341,388 discloses a method of and apparatus for extruding thermoplastic film wherein heaters are positioned in the die body whereby to heat those areas of the die to help maintain the thickness of the sheet substantially constant.

While these patents and others show polymeric film thickness-controlling or related devices, they do not show controlling such thickness of a web of film, in an improved fashion, by positively controlling the heating in a tenter frame of a selected web lane using air plus a heater positioned in a thermally isolated zone to assure that only a preselected area of the film is preferentially heated as in the instant invention.

The accidental, or incidental, heating of lanes adjacent to the lane selected to be heated is a real problem here. This invention resolves that problem by substantially preventing the escape of heat into adjacent lanes using a duct/heater apparatus of the invention. By so controlling heating, it is possible to induce a substantial temperature rise in a given web lane while raising the temperature of adjoining lanes a minimal amount. In so doing, improved film properties result.

SUMMARY OF THE INVENTION

Briefly summarized, this invention is a method of stretching film including the steps of:
  preheating the film preferentially prior to stretching in a tenter frame by heated air by means of an air duct positioned between and closely adjacent the inner edges of the tenter frame clips carrying the film, the bottom wall of the duct having at least one aperture therein extending across the film and such aperture being closely spaced, preferably no more than 1 inch, from the top surface of the film and thereafter stretching the film in the tenter frame.

In greater detail, such a method includes the steps of:
  moving a web of unstretched film into operative relationship with a heating unit, such heating unit including a duct having a top wall, a bottom wall, side walls, and a plurality of intermediate walls between the side walls extending from top to bottom of such duct and throughout its length in the direction of film travel, such duct further having means defining at least an aperture in a wall of said duct, said aperture being closely adjacent a surface of the web of film;
  selectively heating air moving through the duct by heaters positioned between adjacent side and intermediate walls whereby preferentially to heat air passing through a selected zone defined thereby without changing the velocity of the air passing therethrough and through the duct and aperture; and
  thereafter stretching the heated film.

In such method the edges of a web of the film is grasped by tenter frame clips mounted on an endless chain carried by a sprocket wheel; and
  such film is selectively heated while it is substantially free of tension and before it is stretched transversely in a tenter frame along at least one selected longitudinal lane by directing heated air toward a surface of the web, which air is heated by varying the temperature of an electric heater positioned above the web, between air guide walls, at such lane.

An apparatus for performing this method of stretching a web of film includes:
  a tenter frame including a plurality of tenter frame clips carried by two endless chains and guided by tracks having parallel and diverging sections;
  a heating unit for preferentially heating a web of film moving therepast to a stretching temperature positioned between the tenter frame clips and closely adjacent a surface of the web of film, said heating device including:
  a duct having a top wall, a bottom wall and side walls, such duct further having a plurality of intermediate walls extending parallel to the side walls with adjacent side and intermediate walls each defining, with the top and bottom walls, a thermally isolated zone in the duct;
  said duct further having means defining a plurality of apertures extending across the bottom wall of the duct and normal to said side and intermediate walls;
  a web heater positioned between each of the adjacent walls defining a thermally isolated zone; and
  means for varying the temperature of each heater whereby air moving through a given thermally isolated zone may be heated thereby, the thus heated air passing through the apertures in the bottom wall whereby preferentially to heat the web.

Preferably, the heaters extend from the top wall of the duct perpendicular to the upper surface of the web at the entrance of said duct. In another embodiment the heaters are electric and extend the length of the duct.

The bottom wall of the duct is spaced less than 2 inches from the upper surface of the web of film and the side walls of the duct are positioned less than ¼ of an inch from the inner surfaces of the tenter frame clips, in preferred embodiments.

The heated air, as substantially thermally isolated in the zones of the duct, emerges from the apertures and impinges on the web of film and preferentially heats it, in a novel and useful manner, as will be explained.

A key to this invention is the isolating of the heated air flow in the duct whereby it is brought to bear only on a selected area of the web. Such air flowing through the duct, as selectively heated, leaves the apertures at constant velocity. There is a tendency, however, and this is one of the problems the method and apparatus of this invention solves, for the air next adjacent to the side walls of the duct to be somewhat cooler than that in the center of the duct, because such walls serve as a heat sink. By positioning the air heating means or electric heaters between intermediate walls of the duct, it is possible independently to control them separately and thereby to increase the temperature of the heated air between those intermediate walls and, of course, to control the temperature of the air next to the side walls using the heater in the zone defined, in fact, by such side walls. This, in turn, means that the air passing out of the part of the aperture (in the selected zone) will be heated hotter than the air in adjacent zones and by isolating the heated air passing through a particular zone, then through the aperture so that it impinges on a particular area of the web, it is possible to bring about controls heretofore unknown to the art. The isolation, again, of this heated air is the key. Without the walls and without the selective heating means, the heat would be dissipated into adjacent zones and would produce diminished lane resolution and prohibitively long response times, for example. By thermally isolating the air into preselected zones, more effective response times and better controlled heat are available and are realized in shorter time. Thus, the art has available to it a means and method of controlling film properties heretofore not within its group.

DESCRIPTION OF THE PREFERRED EMBODIMENT

Figure 1:
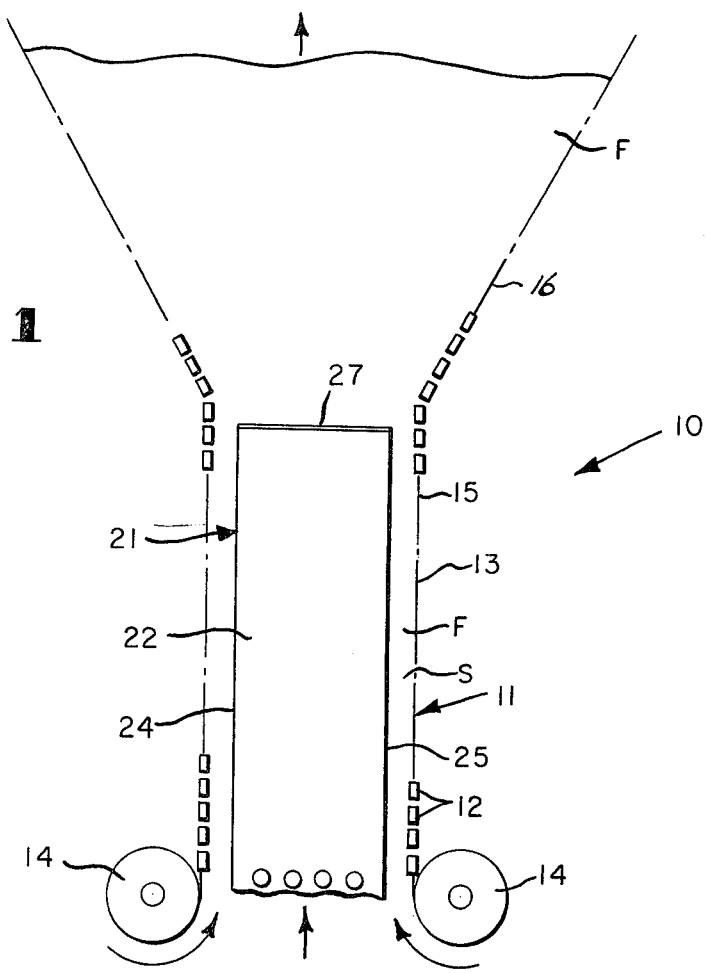
FIG. 1 is a plan view of an apparatus of this invention for stretching a web of film in a tenter frame, showing a heating unit positioned above the film carried by tenter frame clips.

This invention is a method of stretching polymeric film including steps and means of selectively heating lanes of that film prior to stretching in a tenter frame.

In its broadest sense the invention involves, in a method of heating a web of polymeric film prior to transverse stretching, the improvement comprising:

heating the film selectively in lanes by heated air directed toward a surface of such web, such air being heated by multiple heaters and the temperature of the air in a selected lane being controlled by the selected heater in that lane and such heater being located between air guide walls of a duct wherein such air is directed onto the web at a preselected location thereof.

A better understanding of the specifics of such method, in greater detail, may be had by considering the steps of the method as hereinafter explained in detail in conjunction with the drawing.

Referring to such drawing it will be seen that a method of stretching a web of film of this invention includes the steps of:

grasping, in an apparatus generally designated 10 also of this invention, the edges of a web of polymeric film F in a tenter frame 11 by tenter frame clips 12 mounted on an endless chain 13 carried by a sprocket wheel 14;

selectively heating such film F while it is substantially free of tension and before it is stretched transversely in the tenter frame along at least one selected longitudinal lane by directing heated air toward a surface S of the web, which air is heated by varying the temperature of an electric heater positioned immediately above the web, between air guide walls, at such lane.

The apparatus 10 for stretching the web of film F includes:

such tenter frame 11 including the plurality of tenter frame clips carried by the two endless chains and guided by tracks, as shown, having parallel and diverging sections designated 15 and 16;

a heating unit 20 for preferentially heating the web of film F moving therepast to a stretching temperature positioned between the tenter frame clips 12 and closely adjacent the surface S of the web of film, such heating device including:

a duct 21 having a top wall 22, a bottom wall 23 and side walls 24, 25, and an entrance opening 26 and a closed end 27, such duct further having a plurality of intermediate walls 28 extending parallel to the side walls 24, 25 with adjacent side and intermediate walls each defining with the top and bottom walls a thermally isolated zone, designated Z-1, Z-2, Z-3 and Z-4, in the duct 21;

such duct 21 further having means defining a plurality of apertures 29 extending across the bottom wall 23 of the duct and normal to the side and intermediate walls 24, 25 and 28;

an electric heater 30 positioned between each of the adjacent walls defining a thermally isolated zone; and means 31 for varying the temperature of each heater 30 whereby air moving through a given thermally isolated zone may be heated thereby, the thus heated air passing through the apertures 29 in the bottom wall 23 whereby preferentially to heat the web of film F.

Figure 2:
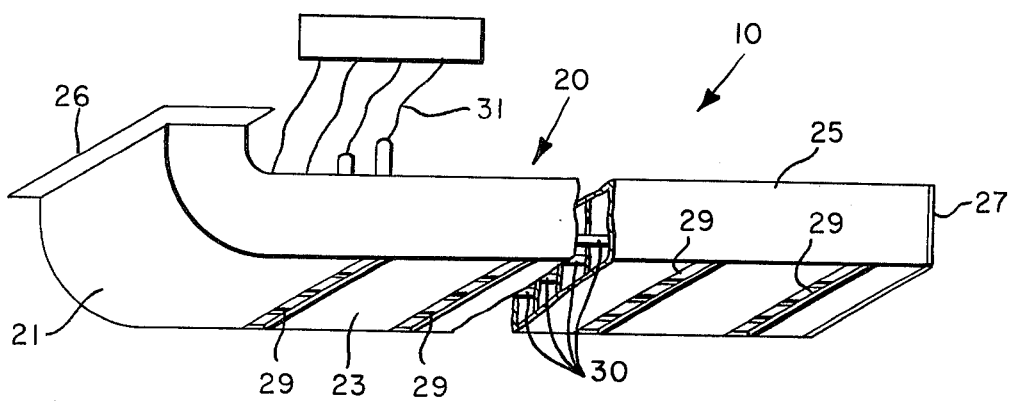
FIG. 2 is a perspective view of a heating unit for preferentially heating a web of film moving therepast, such unit being positioned between the inner edges of tenter frame clips carrying the web in a tenter frame (not shown for clarity).
Figure 3:
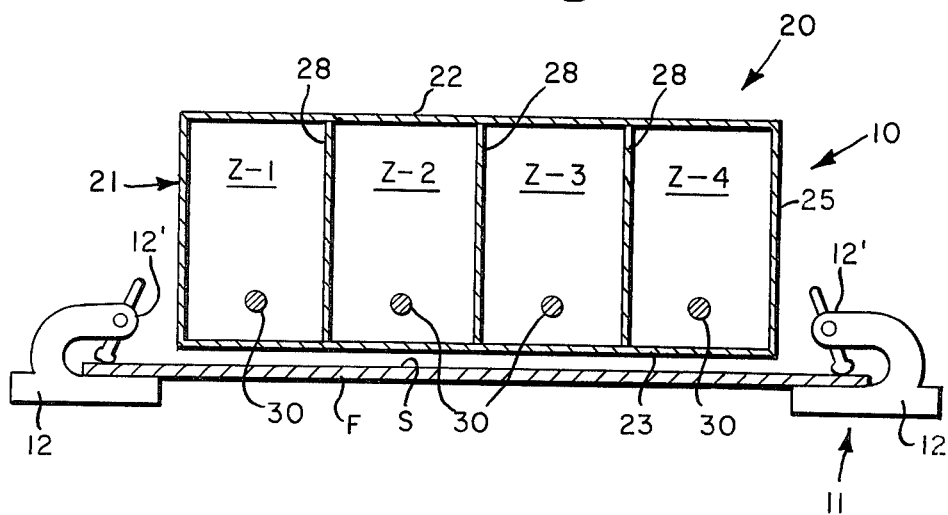
FIG. 3 is a cross-sectional view of the apparatus of 1, across the web, showing heaters positioned in thermally isolated zones of a duct, parallel to web travel.

Preferably the electric heaters 30 extend from the top wall 22 of the duct perpendicular to the upper surface of the web at the entrance opening 26 of the duct. In another preferred embodiment, the electric heaters 30 are tubular and extend the length of the duct, as best seen in FIGS. 2 and 3.

In an important aspect of this invention, the bottom wall 24 of the duct is spaced less than 2 inches from the upper surface S of the web of film F and in a preferred embodiment, the bottom wall 23 of such duct is positioned less than ½ of an inch from the upper surface of the web. Further, the side walls 24 and 25 of the duct are positioned less than ¼ of an inch from the inner surfaces 12' of the tenter frame clips 12, in a preferred embodiment.

This positioning of the duct with respect to the surface of the web being heated and with respect to the inner surfaces of the tenter frame clips — in other words, the duct is positioned between the tenter frame clips and closely adjacent the upper surface of the web — is a key factor in bringing about improved film properties, in accordance with this invention, as now to be explained in greater detail.

It is well known, of course, to use a tenter frame in order to stretch webs of plastic films, fabrics, foils, etc., in the direction of their width. A typical tenter frame generally includes a plurality of tenter frame clips mounted on two endless chains and guided by a pair of diverging tracks. The clips are adapted to grip the edges of a web of material, such as polyethylene terephthalate film, as it emerges from a machine-direction stretching device. Each track is composed of two rails, an inner guide rail and an outer guide rail. The chains are adapted to be moved about two or more motor driven members (usually sprockets) while being disposed in guiding contact with the rails of the diverging tracks during their movement. In this way, the clips on the chains serve to move the web longitudinally, while simultaneously stretching the web transversely.

Before the film can be stretched, however, it must be at or above a certain temperature known as the stretching temperature, which varies with the composition, structure, type and the stretching history of the film (i.e., whether it has previously been stretched). For this heating or preheating of the film, the tenter frame is usually provided with heaters, such as radiant or hot-air. During preheating, the film is maintained under low transverse tension to prevent tearing before it reaches the thermoplastic state, so for this step the rails are substantially parallel.

Often it is desirable or necessary to heat the film to a greater or lesser extent in different longitudinal lanes of the film, especially to apply greater heat to the film close to the tenter clips, which may act as heat sinks, resulting in a difference in temperature between the adjacent part of the film and the major portion of the film, causing thickness and property differences.

Among the causes of the inability to selectively control radiant heat are poor absorption characteristics of film, caused by low absorption coefficients (such as in polyolefins), high reflectively, such as in film filled with white or reflective particles, and the high absorption by metal tenter clips causing them to become too hot. With air heating, in which air is heated at a remote location, with heat adjustments by changing the flow of air through separate ducts by dampers, precise control is difficult because variations in flow cause pressure differences, resulting in spill-over from lane-to-lane.

The method and apparatus of this invention provides for selectively adjusting the heat input to individual lanes of a film as it enters a tenter frame before transverse stretching. The primary means to heat is to impinge heated air on the film. This invention further provides for separation of the heated air into a plurality of zones parallel to the direction of motion of the film, and auxiliary adjustable electric heaters in each zone so as to enable changes in the temperature of the air and thus vary the temperature of the web in parallel longitudinal lanes so that gauge variation may be minimized.

As previously stated, it is known in the art to preheat a web prior to stretching in a tenter frame by means of heated air passing through apertures in a duct positioned over the tenter frame clips. This, again, as previously stated, differs from the method and apparatus of the instant invention in that the aperture in the bottom wall of the duct is a considerably greater distance (more than 2 inches, and around 8 to 12 inches) above the surface of the web that is heated. This creates additional problems, or, at least, lessens the ability to control the heating of the web, within closely defined limits.

In these known devices, using a duct for moving heated air onto the upper surface of the web as it is moved between the parallel tracks of the tenter frame, most problems occur because of the distance between the bottom of the duct and the upper surface of the web, but also because the tenter frame clips tend to adsorb considerable heat adjacent the side walls of the duct and inadequate or undesirable heating often occur, particularly adjacent the edges of the film. This has resulted in film losses, primarily of these edges.

A first key feature of this invention is that for the first time, the air heating duct is positioned between the tenter clips and closely adjacent (no more than 2 inches) from the surface of the film being carried by the tenter clips. This enables air from apertures in the bottom wall of the duct more effectively to heat a web moving under the duct and this brings about dramatic improvements in film properties.

Problems still existed, however, in that the air adjacent to and due to their proximity to, the side walls of the duct, tended to be somewhat cooler and, hence, uneven heating often occurred at the edges of the web. And other problems, this positioning of the duct between the tenter clips left unsolved, again well known to the art, is that in many instances it is highly desirable to provide selective heating of some lanes whereby to improve thickness properties in the stretched web. For example, it is known to change the properties of the stretched web by varying the heat along a lane of that web in keeping with the thickness variations. The positioning of the duct between the tenter frame clips left this problem unsolved.

The second key step, then, of this invention is the provision of means, in the form of the heaters positioned in the isolated zones in the duct, and between intermediate walls of the duct, whereby to provide a selective web heating capability while keeping the velocity of flow onto the web and close to the web, the same. With these principles in mind, the invention will now be described in further detail.

The heating unit 20 includes a plurality of separately adjustable, elongated tubular heaters 30, positioned in the zones of the duct close to the web of film at its upper surface. Each heater 30 or 30' is placed in the zones in close, suitably spaced apart, relationship across the width of the web of film, and, importantly, in the zones Z-1 and Z-4 adjacent the tenter frame clips so that the edges of the web held by these clips may be preferentially heated during the preheating step. A suitable heater of the elongated tubular type is shown in U.S. Pat. No. 3,161,711 to Tassler, which patent is incorporated herein by reference.

The heaters 30 or 30' (such as Calrod heaters) are normally operated at 50% of the rated capacity with adjustments to raise or lower the temperature made by raising or lowering the power above or below the 50% level.

Figure 4:
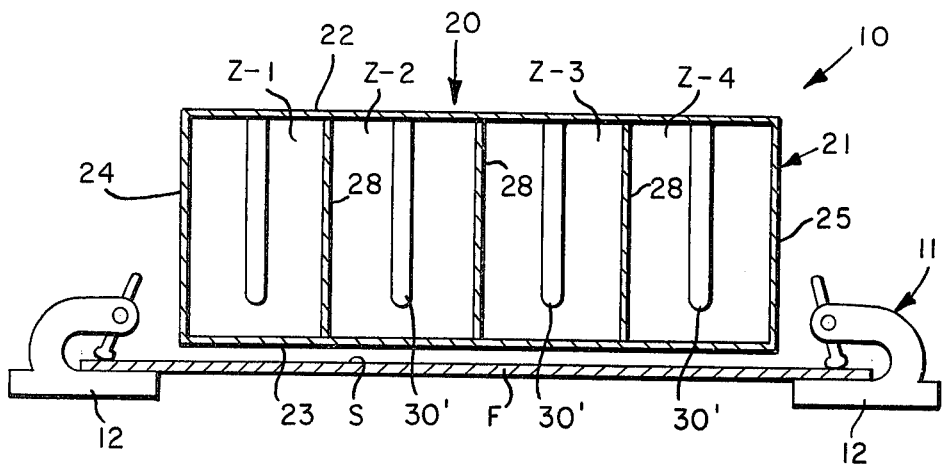
FIG. 4 is a cross-sectional view of the apparatus of FIG. 1, across the web, showing heaters positioned at the entrance of the duct and extending from the top wall of such duct.

In the preferred apparatus the duct is made up of a group of identical parallel longitudinal modules so that by combination of an appropriate number of the modules the width of the heating unit can be adjusted to heat the film as close to the tenter clips as possible. Each of the modules has an individual internal heater, and the entire group is coupled to a control panel having power (voltage) adjustment means (Variac adjustable autotransformers), ammeters and thermocouple indicators for respective modules. These heaters 30 or 30' may extend parallel to the direction of web travel thoughout the length of the duct but, preferably, are in the form of tubular heaters positioned perpendicular to the upper surface of the web and extending from the top wall of the duct to a position closely spaced from the bottom wall in a given duct zone. (See FIG. 4).

Means 31 are provided for adjusting power to these heaters whereby their temperature may be varied in accordance to desire. By selectively increasing the power to an electric heater in a given duct zone, the temperature of the air flowing in the duct past that heater in that zone is heated hotter than the air in the zone next to it. The intermediate walls 28 isolate this hotter air from the air flowing in adjacent zones and such selectively heated air passes through the apertures 29 and onto the upper surface of the web positioned closely adjacent to the duct, preferentially to heat the web in that location. While there tends to be a slight dissipation into adjacent zones it is minimal and, thus there is provided a proven and effective way to control, in a tenter frame, preferential heating of a web passing therethrough.

The film after being heated is moved to a stretching means either to a machine direction stretching means, such as spaced apart nip rolls or, as shown, to a tenter frame, as is known in the art, where the film is stretched. The film is then generally heat-set in known manners to various heatsetting temperatures and thereafter is wound on to a windup roll and stored for use.

In practicing this invention, typical heating temperatures prior to stretching are shown in U.S. Pat. No. 2,823,421; typical tenter frame apparatus are shown in U.S. Pat. Nos. 3,118,212 and 3,727,273; typical stretching techniques are shown in U.S. Pat. Nos. 2,823,421 and 2,995,779, which patents are incorporated herein by reference.

By following the method and by using the apparatus as described, preferential, carefully controlled heating of a selected lane or group of lanes of a polymeric film immediately prior to subjecting it to stretching forces is made possible. In the short period of time between heating and stretching the thicker portions cool more slowly than the thinner portions of the film, thus sharpening the temperature differential between them and allowing the thicker portions to stretch more upon application of force and tending to improve the thickness properties of the film.

In a typical method of making a film such as polyethylene terephthalate, the molten polymer is extruded from a die onto a cooled drum where it is quenched, leaving the film in a substantially amorphous condition. This film then passes to a first stretching means. This stretching can be in the longitudinal direction by stretching the film between two sets of rolls by operating one set at a higher speed than the other or the stretching can be in the transverse direction by means of a tenter frame wherein the film is stretched by the use of moving, diverging tenter frame clips. Generally, it is typical to stretch the film in both directions with one of the above stretching operations following the other, the stretching operation which precedes being a matter of preference in the particular case.

By monitoring the web thickness, it is possible to actuate the appropriate lane heater(s) which heats the lane or group of lanes of the amorphous film web after it leaves the quench drum and before it passes into the transverse direction tenter stretcher.

To accomplish the specific lane heating, this invention employs the zone heaters, as described, comprising a plurality of tubular element electrical heaters disposed parallel to each other in the longitudinal direction. Such heaters are positioned over the film immediately ahead of the slow nip rolls or immediately ahead of the film's entry to the tenter frame stretcher, according to the stretching sequence to be followed. The distance between the heaters and slow nip rolls or tenter frame is such that the unintentionally heated thin portions of the film will become cool prior to stretching. There are many variables that determine this distance, e.g., the rate of film travel, the thickness deviation of the film and the temperature of the heaters, and can best be determined from the conditions of a particular run.

Preferably, the heaters are disposed for the full width of the film web and are spaced with a center-to-center distance of one inch.

The temperature to which the film is heated is regulated by power attached to each heater. This voltage is set in advance according to the thickness deviation of the film and the rate of film travel. The rate of stretching of thicker lanes is effectively altered if the temperature difference between the thicker and thinner portions of the film is as little as 0.1° C. Of course, the heater for the thickest lane will be turned to a higher voltage than the remaining heaters. The voltage of the other heaters are adjusted according to the extent to which the corresponding lane was thicker than the desired film.

This invention is effective in use immediately before stretching either in the longitudinal or transverse directions. Any crystalline or crystallizable thermoplastic polymer can be used in the manufacture of films according to the process of this invention. Such polymers would include: polyolefins and blends thereof; polyethylene-2,6-naphthalate; polytetramethylene-1,2-dioxybenzoate; polyethylene-1,5-naphthalate; polyhexamethylene adipamide; polyhexamethylene sebacamide; polycaprolactam; and copolymers of ethylene terephthalate and ethylene isophthalate. Films of substantially amorphous non-crystallizable polymers such as polystyrene can also be employed. A preferred method relates to the treatment of substantially amorphous polyethylene terephthalate film.

This invention is particularly suited for the production of filled, stretched polyethylene synthetic paper by a flat-sheet method. It is adaptable to the transverse stretching of other thermoplastic films, such as those of polyethylene terephthalate. The essence of the invention is not that it changes the overall heat input to the film, but that it provides a means to selectively adjust the heat input to individual longitudinal lanes of the film.

This use of this modular duct heating unit in the preheat area of the tenter frame positioned between the tenter rails and very close to the upper surface of the film assures lane temperature control and even stretching over the entire sheet right up to the tenter clips. This invention is peculiarly adapted to preheat filled films.

In brief again, this invention is a method of stretching film including the steps of:

preheating the film preferentially prior to stretching in a tenter frame by heated air by means of an air duct positioned between and closely adjacent the inner edges of the tenter frame clips carrying the film, the bottom wall of the duct having at least one aperture therein extending across the film and thereafter stretching the film in the tenter frame.

In the duct, intermediate walls define duct heating zones and a heater is positioned in each zone, and such method further including the steps of:

supplying power to a selected heater whereby further to heat the air moving therepast in this selected zone, such heated air being substantially isolated from the air in the other zones and being moved through the duct and out the aperture in the bottom wall whereby preferentially to heat the film moving under the aperture in the selected zone. The heated air emerges from the apertures and impinges on the web of film and preferentially heats it.

We claim:

1. An apparatus for stretching a web of thermoplastic polymeric film including:
   (a) a tenter frame having a plurality of tenter frame clips carried by two endless chains and guided by tracks having parallel and diverging sections; and
   (b) a heating unit for heating a web of film moving therepast to a stretching temperature, said heating unit positioned entirely between the tenter frame clips in a parallel section of the tenter frame and closely adjacent a surface of the web of film, such isolation of the heating unit allowing thicker portions of the film web to stretch more uniformly in the diverging section of the tenter frame to improve the thickness properties thereof, said heating unit including:

(i) a duct having a top wall, a bottom wall and side walls, and, further, having a plurality of intermediate walls extending parallel with the side walls and defining, with the top and bottom walls, thermally isolated zones in the duct, said bottom wall having a plurality of apertures with each aperture extending thereacross normal to said side and intermediate walls;

(ii) a heater positioned in each thermally isolated zone; and (iii) means for varying the temperature of each heater, independently, whereby air moving through any thermally isolated zone is selectively heated and passed through the apertures in the bottom wall to heat the film web adjacent to those apertures and to minimize dissipation of heat into adjacent zones.

2. The apparatus of claim 1 wherein the heaters extend from the top wall of the duct perpendicular to the upper surface of the web at the entrance of said duct.

3. The apparatus of claim 1 wherein the heaters are electric and extend the length of the duct.

4. The apparatus of claim 1 wherein the bottom wall of the duct is spaced less than 2 inches from the upper surface of the web of film.

5. The apparatus of claim 1 wherein the bottom wall of the duct is positioned less than ½ of an inch from the upper surface of the web of film.

6. The apparatus of claim 1 wherein the side walls of the duct are positioned less than ½ of an inch from the inner surfaces of the tenter frame clips.

* * * * *

UNITED STATES PATENT OFFICE
CERTIFICATE OF CORRECTION

PATENT NO. : 4,104,769
DATED : August 8, 1978
INVENTOR(S) : Stanley Burton Levy and William Drake Garlington It is certified that error appears in the above-identified patent and that said Letters Patent are hereby corrected as shown below:

Column 1, line 55, "3,304,205" should be -- 3,404,205 --.
Column 2, line 13, "whence" should be -- when --.
Column 2, line 46, "trail" should be -- trial --.

Signed and Sealed this

Seventeenth Day of July 1979

[SEAL]

Attest:

LUTRELLE F. PARKER
Attesting Officer      Acting Commissioner of Patents and Trademarks